United States Patent [19]

Stemme et al.

[11] 4,280,142

[45] Jul. 21, 1981

[54] OPTICAL REPRODUCING DEVICE FOR A SUPER-8 FILM READER

[75] Inventors: Otto Stemme, Munich; Eduard Wagensonner, Aschheim; Wolfgang Ruf, Munich, all of Fed. Rep. of Germany

[73] Assignee: AGFA-Gevaert, A.G., Leverkusen, Fed. Rep. of Germany

[21] Appl. No.: 104,161

[22] Filed: Dec. 17, 1979

[30] Foreign Application Priority Data

Dec. 22, 1978 [DE] Fed. Rep. of Germany ....... 2855799

[51] Int. Cl.³ .............................................. H04N 3/36
[52] U.S. Cl. .................................................. 358/214
[58] Field of Search ............................... 358/214, 215

[56] References Cited

U.S. PATENT DOCUMENTS 4,148,071  4/1979  Zinchuk .............................. 358/214

Primary Examiner—Robert L. Richardson
Attorney, Agent, or Firm—Michael J. Striker

[57] ABSTRACT

Light is directed from a source through a developed and travelling motion-picture film, to pass through a reproduction lens. This light is intercepted by a tilting mirror which reflects it back through the lens where it is intercepted by a stationary mirror and reflected onto an opto-electronic receiver for conversion into signals which permit showing of the film images on a television screen.

7 Claims, 2 Drawing Figures

OPTICAL REPRODUCING DEVICE FOR A SUPER-8 FILM READER

BACKGROUND OF THE INVENTION

This invention relates to an optical reproducing device for a super-8 film reader.

More particularly, the invention relates to a device for the optical scanning of super-8 film for the purpose of reproducing the film images on a television screen.

A device of this type has already been proposed in German Published Patent Application OS No. 28 31 296 to which reference may be had for details. In particular, the electronic circuitry there described may be used in the device according to the present invention also, and will therefore not be described in detail hereinafter.

The aforementioned prior art device has a lighting system for illuminating the film frames, a picture-reproducing objective, and a tilt mirror which vertically deflects the film images reproduced by the objective. The deflection is effected at a frequency corresponding to the television requirements but taking into account the film advancement speed, and the light reflected by the tilt mirror is directed onto an opto-electronic image receiver. This prior-art device is satisfactory, but the required tilt mirror must be relatively large, with the various disadvantages resulting from this fact.

SUMMARY OF THE INVENTION

It is an object of the invention to improve on the aforementioned prior-art device.

A more particular object of the invention is to provide a device of the type under discussion, which is capable of operating with a tilt mirror having the smallest possible dimensions.

Pursuant to these objects, and still others which will become apparent hereafter, one feature of the invention resides in an optical reproduction device for a Super-8 film scanner to produce the film images on a television screen, comprising means for advancing a film in a plane; a light source at one side of the plane; an image-reproducing lens at the other side of the plane and positioned on the optical axis of the light source so that light passing through the film enters and passes through the lens; a tilt mirror arranged beyond but adjacent to the lens so as to reflect the light rays leaving the lens, back through the same at an angle to the optical axis and at a frequency required for reproduction on a television screen; and a fixed mirror between the lens and film advancing means the fixed mirror being positioned to intercept light rays reflected back through the lens by the tilt mirror and to reflect them to an opto-electronic receiver.

A device constructed in accordance with the invention permits optimum utilization of the mirror surface area.

In accordance with one embodiment of the invention the fixed (stationary) mirror is located eccentrically with reference to the optical axis of the objective. In another embodiment a stronger lighting system is used, and the fixed mirror is semi-transparent, is located on the optical axis of the lighting system, and includes an angle of 45° with the optical axis. In this arrangement the objective produces the smallest possible distortions since the path of the light rays is completely centric.

It is advantageous if the image distance and the object distance are each located in the focal plane of the objective, because the distance of the tilt mirror from the objective is then of no consequence for the image distance.

The objective and the tilt mirror may advantageously be mounted in a common housing. This assures that only a single opening need be provided for passage of the light rays, namely through the objective, so that additional light-transmitting housing parts are not needed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
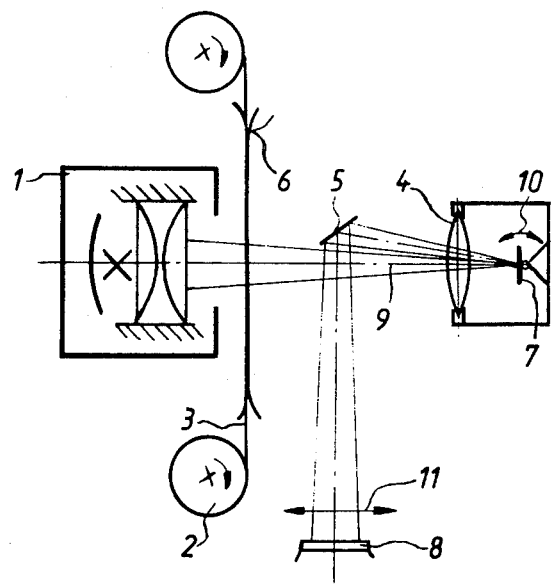
FIG. 1 is a somewhat diagrammatic illustration of a first embodiment of the invention.

In the embodiment of FIG. 1 an exposed and developed motion picture film 3 travels along a wall 6 provided with a film window and is taken up on a take-up spool 2. Located in front of the film 3 is a reproducing objective 4, and located behind the film is a lighting system 1. The light from system 1 passes through the film window and the film 3, and thereupon through the objective 4 which reproduces an image on a tilt mirror 7 that is located behind the objective 4.

The tilt mirror 7 is of the type used in loop galvanometers; its motion (indicated by the double-headed arrow 10) is controlled by a not-illustrated adder and amplifier (known per se) to deflect the reproduced images in vertical direction at the frequency (50 cycles) required by television systems, making due allowance for the film advancement speed. The tilt mirror 7 is located closely behind the objective 4 and is arranged normal or almost normal to the optical axis 9 of the objective, so as to assure optimum utilization of the mirror surface.

Located in front of the objective 4, but out of the path of light rays travelling from the film to the objective, is a fixed (stationary) mirror 5. The light reflected by the tilt mirror 7 passes back through the objective 4 and impinges the mirror 5 which reflects it onto an opto-electronic receiver 8 which may be a row of CCD-photo diodes.

It is evident that with this arrangement the movement of tilt mirror 7 results in a line-by-line scanning of the S-8 film image. The movement of the image is indicated by the double-headed arrow 11. The row of photo diodes of receiver 8 contains, for each desired scanning point, three sensor elements which are arranged sequentially in the longitudinal direction of the diode row and are respectively sensitive to red, green and blue tones. Each of these sensor elements (not shown) is constantly connected to a registering device.

It is advantageous that in this embodiment the objective 4 and the tilt mirror 7 can be accommodated in a common housing (not shown) so that only a single opening (i.e. for the objective 4) need be provided for passage of the light rays. This eliminates the need for additional light permeable or penetrable housing parts.

The size of reproduction depends upon the dimensions of the receiver 8; the objective 4 is designed for the particular application and the image distance depends upon the distance between objective 4 and tilt mirror 7. For a 1:1 reproduction ratio the telecentric light-ray path is advantageous, in which the image distance and the object distance are located in a focal plane of the objective and the spacing between tilt mirror 7 and objective 4 is without any influence on the image distance.

Different types of lighting systems 1 may, of course, be chosen. If the system 1 produces a strong light, then the embodiment according to FIG. 2 may be used which is basically the same as in FIG. 1, so that the same reference numerals have been employed.

Figure 2:
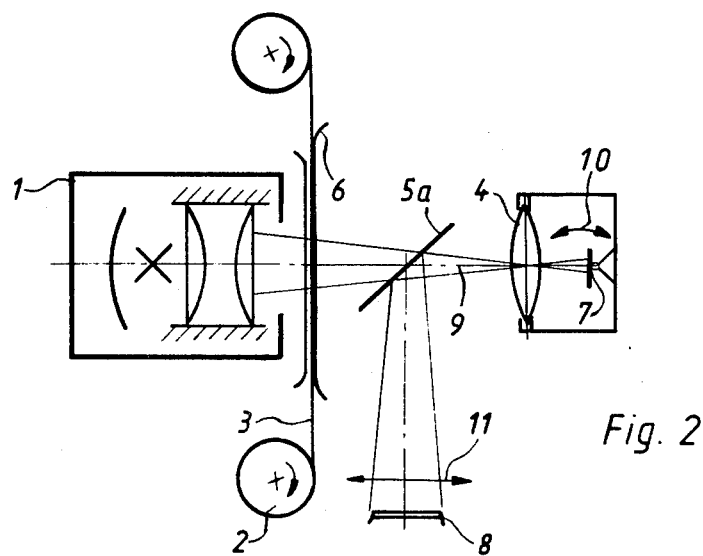
FIG. 2 is an illustration similar to that in FIG. 1, but showing a second embodiment.

However, the embodiment in FIG. 2 differs from the one in FIG. 1 in that the total-reflection mirror 5 is replaced with a semi-transparent fixed mirror 5a which is arranged at an angle of 45° to the optical axis 9. The planes of the objective 4 and tilt mirror 7 are located normal to the optical axis 9 and the beam of light rays entering objective 4 from the film, and then re-entering it from the mirror 7, passes in both instances through the same spot at the center of the objective 4. Since the light rays pass completely centrally through the objective 4, the embodiment of FIG. 2 produces the smallest possible reproduction errors, such as distortions or the like.

In the prior-art device mentioned earlier herein the tilt mirror is located at a 45° angle relative to the optical axis of the lighting system. The present invention arranges the mirror surface of tilt mirror 7 normal to the optical axis 9 of the system 1 and objective 4, and the mirror 7 tilts symmetrically about this position with a small angular deviation. This results in optimum utilization of the mirror surface of mirror 7.

While the invention has been illustrated and described as embodied in a device for reproducing film images on a televison screen, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected be Letters Patent is set forth in the appended claims:

1. An optical reproduction device for a Super-8 film scanner to reproduce the film images on a television screen, comprising means for advancing a film in a plane; a light source at one side of said plane; an image-reproducing lens at the other side of said plane and positioned on the optical axis of the light source so that light passing through the film enters and passes through the lens; a tilt mirror arranged beyond but adjacent to said lens so as to reflect the light rays leaving the lens, back through the same; and a fixed mirror between said lens and film advancing means, said fixed mirror being positioned to intercept light rays reflected back through the lens by said tilt mirror and to reflect them to a device for converting the light rays into electrical signals.

2. A device as defined in claim 1, wherein the distance between said lens and said tilt mirror is smaller than the focal length of the lens.

3. A device as defined in claim 1, wherein said fixed mirror is located laterally of the path of light rays travelling from said light source to said lens.

4. A device as defined in claim 3, wherein said fixed mirror is a total-reflection mirror.

5. A device as defined in claim 1, wherein said fixed mirror is a semi-transparent mirror and is located in the path of light rays travelling from said light source to the lens, said fixed mirror including an angle of 45° with said path.

6. A device as defined in claim 1, wherein the image distance and the object distance are located in the focal plane of the lens.

7. A device as defined in claim 1, wherein said lens and tilt mirror are mounted in a common housing.

* * * * *